United States Patent Office 2,868,773
Patented Jan. 13, 1959

2,868,773
PROCESS OF INSOLUBILIZING PROTEINS

Bernard H. Kress, Lafayette Hill, Pa., assignor to Quaker Chemical Products Corporation, Conshohocken, Pa., a corporation of Pennsylvania No Drawing. Application May 15, 1956
Serial No. 584,895

6 Claims. (Cl. 260—112)

This invention relates to a method of insolubilizing proteins and compositions containing proteins. It is an object of this invention to provide a process for the controlled insolubilization of proteinaceous materials by suitably reacting proteins with polyacetals derived from dialkylene or polyalkylene glycols. In particular, it is an object of this invention to insolubilize proteins by reacting same with polyformals. It is a further object of this invention to provide a rapid method for such insolubilization. Another object is to provide a method of insolubilizing proteins which does not give rise to obnoxious formaldehyde odors. Other objects of this invention will be apparent from the following description.

It is well known to the art that formaldehyde will react with proteins to yield insoluble products, or otherwise denature them. Although a great deal of speculation has arisen concerning the actual chemical reactions involved, their precise nature is still far from clear. Despite this fact, however, commercial processes of many kinds have been developed based upon this general reaction. Formaldehyde is used, for example, to insolubilize proteins for adhesive applications, paper coatings, fiber production, plastics manufacture, tanning, and the like. In all of these operations, however, the process is difficult to control. It is carried out with aqueous solutions of formaldehyde which are extremely obnoxious because of their odor. The reactions are often slow and are relatively difficult to control. They are progressive over a period of time and cannot easily be adapted to modern methods of mass production. Thus, for example, in the manufacture of casein plastics, the casein mass, with or without such adjuvants as alum, is extruded as rods or pressed into sheets and allowed to stand immersed in a 4–5% formaldehyde bath for periods ranging from a few weeks to several months after gradual penetration of formaldehyde and reaction therewith produces sufficient hardening to yield an insoluble plastic material which can then be either mechanically or chemically polished to high gloss. Because of the difficulty in control of this process which gives rise to many vagaries in production of such plastic materials, casein plastic has been reserved for use only in very small volume and highly specialized applications such as decorative buttons, buckles, and costume jewelry.

Commercial processes for paper coating involve the treatment of paper with solutions of protein containing formaldehyde. If the formaldehyde is too concentrated, immediate thickening of the solution results and the protein is rendered unavailable. Furthermore, on continuous running of such coating operations, protein solutions containing formaldehyde have a tendency to thicken gradually so that operating conditions have to be varied and the coating bath eventually becomes useless. Moreover, the volatility of the formaldehyde component of this coating mixture is such as to make rapid insolubilization by heating difficult to control. In commercial practice, therefore, the paper industry has resorted to separate treatments in order to develop water resistance by reaction of casein, soya protein, or gelatin coatings with formaldehyde.

Proteins have also been utilized as a binder for pigments in textile printing. They are then insolubilized with formaldehyde. If this insolubilization is carried out by passing the printed goods through steam and formaldehyde vapors there is danger that only surface reaction will occur. If the formaldehyde is added directly into the printing paste, although more durable fixation results, it is again difficult to control the coagulating effect of the aldehyde because it is necessary to steam the goods or to expose them to air, for a protracted period in order to develop insolubility and this process is likewise hard to control.

One of the most serious stumbling blocks which has thus far delayed the commercial development of semi-synthetic fibers from the proteins of corn, peanuts, milk, chicken feathers and the like, is also to be found in the difficulty of control of the hardening baths containing formaldehyde into which the proteinaceous syrup is spun.

I have now found that many of the objections to the use of formaldehyde as a hardening agent for proteins can be overcome by utilizing water-soluble polyacetals and, particularly polyformals derived from dialkylene or polyalkyleneglycols and curing under appropriate acidic conditions. Such products can be readily manufactured. They are substantially free from formaldehyde odors so that the use of these materials is not subject to this obnoxious characteristic of formaldehyde baths. It is possible, for example, to produce polyformals in such fashion that the final product will contain only a few tenths of one percent, or less, of free formaldehyde as determined by chemical analysis. By properly mixing these polyformals, which are water-soluble, with aqueous solutions or slurries of various proteins or by treatment of properly wetted solid proteins such as leather with these polyformals it is possible to obtain a mass that, upon drying and curing under acidic conditions, exhibits marked resistance to solubilization or swelling by water. By controlling the nature of the polyformal, the character of the catalyst, and the time and temperature of cure it is possible to adapt this procedure for insolubilizing proteins to a wide variety of applications, including all of those presently employing formaldehyde as a so-called "hardening" agent.

A typical example of a product highly useful for the insolubilization of proteins is shown in Example 1.

Example 1

| | Percent |
|---|---|
| Paraformaldehyde (91%) | 16.6 |
| Diethylene glycol | 53.3 |
| Toluene | 4.7 |
| Sulfuric acid (99%) | 0.1 |
| Water | 25.3 |

All of the above components except water are mixed and heated under reflux, using a Dean and Stark moisture trap to remove water azeotropically. After 12.4% of the weight of the original charge is removed as water of reaction, the toluene is evaporated in vacuum, the water added and the solution neutralized with sodium hydroxide solution to a pH of 7. The product was completely soluble in water and in toluene. It had a faint ethereal odor and was somewhat viscous. It was free of formaldehyde odor under normal room conditions. The product had a molecular weight of 480 (Rast) and a hydroxyl equivalent of 220 which indicates it had a linear polymeric structure. It had a specific gravity of 1.155 at 34.5° C. The refractive index was $N_d 30 = 1.462$. The molecular weight and hydroxyl equivalent of the condensation product of this example indicate that it possesses a polymeric structure, containing an average of four diethylene glycol units, as shown in the following formula:

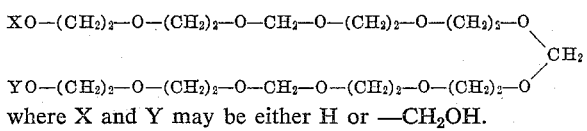

where X and Y may be either H or —CH$_2$OH.

The product can be utilized for the insolubilization of a wide variety of proteins as shown by the following examples.

*Example 2*

A four percent solution in water of edible gelatin was prepared and divided into three parts. To one part was added one percent by weight of the product of Example 1, together with 1% by weight of a 1:4 mixture of zinc chloride and diglycolic acid. To the second part of this gelatin solution there was added only 1% by weight of the 1:4 zinc chloride-diglycolic acid mixture; and to a third part no addition was made. These three solutions were then cast in petri dishes and heated for 20 minutes at 200° F. The resulting film was examined for water solubility. It was found that the film prepared by use of the product of Example 1, together with catalyst, was insoluble in water, whereas both of the other two films were soluble. The films of these experiments were tested by overlaying with water.

*Example 3*

A 2% solution of zein in aqueous isopropyl alcohol was prepared and divided into three portions and treated as in the case of Example 2.

Films of these three solutions were cast in petri dishes and heated for 20 minutes at 200° F. After cooling, the solubility of these films was tested in the original aqueous alcohol solvent by overlaying them therewith. Here, again, the film prepared from the zein solution containing both the product of Example 1 and catalyst was insoluble in the solvent whereas the other two films were soluble.

*Example 4*

A 2% solution of casein was prepared in aqueous ammonia and divided into five parts. To one part was added 5% of the product of Example 1 and 2% of ammonium chloride. To another part was added only 2% of ammonium chloride. To a third part nothing was added. To a fourth part 5% of the product of Example 1 was added together with 2% of ammonium thiocyanate, and to the fifth part was added only 2% of ammonium thiocyanate. These five solutions were cast in petri dishes and heated for 20 minutes at 200° F. After cooling, the films were tested by overlaying them with concentrated ammonium hydroxide solution. The film prepared from the casein solution containing the product of Example 1 and ammonium chloride and that from the product of Example 1 and ammonium thiocyanate was insoluble in each case in concentrated ammonium hydroxide. The other three films were soluble.

At no point during any of the treatments described in Examples 2 to 4 was there generation of any formaldehyde odor. It is, therefore, apparent that I have developed a method of insolubilizing proteins which is free from the obnoxious difficulties attending the use of formaldehyde. My procedure can also be carried out within a short period of time and is subject to strict chemical control by adjustment of the reaction conditions as hereinbefore described.

Instead of utilizing the product of Example 1 for carrying out insolubilization, I may use polymeric condensation products by starting with polyoxyalkylene glycols such as dipropylene glycol, dibutylene glycols and higher dialkylene glycols, polyalkylene glycols, mixtures thereof, or their mixtures with diethylene glycol which are reactive with formaldehyde or other aldehydes to form water-soluble products or products which are dispersible in water, either alone or with the aid of appropriate adjuvants. Polyoxyalklene glycols, such as triethylene glycol, tetraethylene glycol, tripropylene glycol and the like, may also be used, either alone or in admixture with the aforementioned dialkylene glycols. The term "alkylene" as used in the claims is understood to include a doubly unsatisfied aliphatic radical containing a substituted or unsubstituted straight chain possessing from two to four carbon atoms in the chain and having its unsatisfied valences on either adjacent or separated carbon atoms.

The following Example 5 is illustrative of a suitable product prepared from two dialkylene glycols and formaldehyde.

*Example 5*

| | Parts |
|---|---|
| Diethylene glycol | 85 |
| Dipropylene glycol | 27 |
| Paraformaldehyde (91%) | 33 |
| Toluene | 20 |
| Sulfuric acid (99%) | 0.1 |

These reagents were treated as in Example 1. The resulting product was a viscous liquid which, prior to the addition of water, formed a crystalline mass below zero degrees C. The product was soluble in water and can easily be rendered neutral by suitable addition of alkali. It is suitable for insolubilizing protein containing materials by the same procedure described in Examples 2 to 4.

Instead of using formaldehyde or formaldehyde-generating materials, such as paraformaldehyde, trioxane or methylal, I may also use other aldehydes containing up to 8 carbon atoms, such, for example, as acetaldehyde, propionaldehyde, butyraldehyde or 2-ethyl hexaldehyde. I may also use dialdehydes, such as glyoxal, glutaraldehyde or hydroxy adipaldehyde. A typical example in which glyoxal is employed is given in Example 6.

*Example 6*

| | Parts |
|---|---|
| Diethylene glycol | 106 |
| Paraformaldehyde (91%) | 52 |
| Glyoxal (30%) | 39 |
| Toluene | 20 |
| Sulfuric acid (99%) | 0.1 |

These components were reacted as in Example 1. The product was a somewhat viscous, yellow liquid, prior to addition of water, and possessed a faint ethereal odor. It again was easily soluble in water and can readily be neutralized for use as shown in Examples 2 to 4.

Various polyhydric alcohols, such as glycerine, penterythritol, and sorbitol, may be added to the alkylene glycols during the course of the preparation of my polyformals in amounts up to about 50 mol percent of the glycols. The following example illustrates the use of sorbitol as such a modifier.

*Example 7*

| | Parts |
|---|---|
| Diethylene glycol | 80 |
| Sorbitol | 32 |
| Paraformaldehyde (91%) | 30 |
| Toluene | 20 |
| Sulfuric acid (99%) | 0.1 |

These reactants were treated as in Example 1. The product prior to the addition of water, was a crystalline mass at room temperature with virtually no odor. It was soluble in water and amenable to the same applications as shown in Examples 2 to 4.

If desired, the polymeric chains of the compound which I use in my invention may be terminated either in whole or in part by means of an alkyl radical. The alkyl radical may be introduced in any suitable manner. For example, I may co-react an aldehyde and a polyglycol in the presence of a minor amount of a half ether of a glycol to serve as a chain stopper. Such preparation is illustrated in the following example.

*Example 8*

| | Parts |
|---|---|
| Diethylene glycol | 101 |
| Beta-methoxyethanol | 4 |
| Paraformaldehyde (91%) | 30 |
| Toluene | 20 |
| Sulfuric acid (99%) | 0.1 |

The above materials were reacted as in Example 1 to yield a viscous liquid, possessing a faint ethereal odor, which could be dissolved in water and neutralized as shown in Example 1. The polymeric nature of this product was shown by determining its molecular weight by the Rast method prior to addition of water. It had a value of 637. This product is useful for insolubilization of proteins by the method of Examples 2 to 4.

In preparing the polyformals which I use in my invention I prefer to react substantially equal molar ratios of aldehyde to polyglycol but I may also use an excess of either reactant. In forming the condensation product, it is necessary to have a strongly acidic catalyst present, such as sulfuric acid, alkane sulfonic acid, phosphoric acid, and acid halides or acidic metallic halides or other acidic inorganic compounds, such as zinc chloride, stannic chloride, aluminum chloride, acid clays, and the like. In general, those catalysts which are well known to the art for alkylation, esterification, and Friedel-Crafts reactions may be employed in making the condensation products which I use for the insolubilization of proteins. Instead of toluene other azeotropic vehicles which may be used are benzene, xylene, ethyl benzene, and the like. Condensation products which I use in this invention are of polymeric nature as illustrated by the molecular weight given for the product of Example 8. This is further illustrated by the molecular weight of the product of Example 1 which was found to be 480.

In carrying out the insolubilization of proteins according to the method of my invention, it is necessary that I cure the combination of protein and polyformal, or polyacetal, at elevated temperature under acidic conditions. It is not possible, for example, to obtain insolubilization by the use of these polyacetals by simple exposure of the protein to their aqueous solution. Minimum curing temperatures of 150° F. are required. In this respect, as well as in others which I have described, my method of insolubilization differs markedly from that used with formaldehyde where more or less lengthy exposure to formaldehyde itself at room temperature affects insolubilization. As catalyst, I may employ any suitable acidic material. By suitable I mean any material of acidic nature which will not cause deleterious action on the protein itself. For example, in addition to zinc chloride-diglycolic acid mixtures, ammonium chloride and ammonium thiocyanate shown in Examples 2 to 4, I may also use other catalysts, such as magnesium chloride, zinc chloride, or combinations of these materials with various acids, such as formic acid or acetic acid.

In addition to the polyformals disclosed, I may also employ those which are modified with fatty alcohols, fatty acids, fatty amides, and other materials having reactive hydrogens.

My insolubilization procedure is applicable to all known proteins including, in addition to those mentioned above, keratin from feathers, albumen, gliadin, soybean protein and various modified proteins.

My treatment is applicable for use in tanning, fiber preparation, such as insolubilization of zein fiber, paper coatings, plastics manufacture, including both molded and extruded objects, decorative and protective coatings for metal parts, adhesive manufacture, textile treatment, paint manufacture, printing inks and pastes, and other allied objects.

I claim:

1. The process of insolubilizing protein from an aqueous solution thereof which comprises treating said protein with a water-soluble acetal polymeric condensation product made by reacting an aliphatic aldehyde containing not more than 8 carbon atoms and a polyoxyalkylene glycol containing 2 to 4 alkylene radicals, in the presence of an acid catalyst at a temperature of at least 150° F.

2. The process of insolubilizing protein from an aqueous solution thereof which comprises treating said protein with a water-soluble acetal polymeric condensation product made by reacting an aliphatic aldehyde containing not more than 8 carbon atoms, a polyoxyalkylene glycol containing 2 to 4 alkylene radicals, and a polyhydric alcohol selected from the group consisting of glycerine, pentaerythritol and sorbitol in amount up to about 50 mol percent of said glycol, in the presence of an acid catalyst at a temperature of at least 150° F.

3. The process of insolubilizing protein from an aqueous solution thereof which comprises treating said protein with a water-soluble acetal polymeric condensation product made by reacting diethylene glycol and formaldehyde, in the presence of an acid catalyst at a temperature of at least 150° F.

4. The process of insolubilizing protein from an aqueous solution thereof which comprises treating said protein with a water-soluble acetal polymeric condensation product made by reacting diethylene glycol, formaldehyde and a polyhydric alcohol selected from the group consisting of glycerine, pentaerythritol and sorbitol in amount up to about 50 mol per cent of said glycol, in the presence of an acid catalyst at a temperature of at least 150° F.

5. The process of insolubilizing a protein selected from the group consisting of corn protein, peanut protein, casein, gelatin, zein, albumin, keratin, leather protein, gliadin, and soybean protein which comprises treating said protein with a water-soluble acetal polymeric condensation product made by reacting an aliphatic aldehyde containing not more than 8 carbon atoms and a polyoxyalkylene glycol containing 2 to 4 alkylene radicals, in the presence of an acid catalyst at a temperature of at least 150° F.

6. Insolubilized protein produced by the process as defined in claim 1.

References Cited in the file of this patent

UNITED STATES PATENTS

| 1,846,356 | Pierson | Feb. 23, 1932 |
| 2,185,111 | Coleman | Dec. 26, 1939 |
| 2,185,112 | Coleman | Dec. 26, 1939 |
| 2,185,118 | Coleman | Dec. 26, 1939 |
| 2,185,120 | Coleman | Dec. 26, 1939 |
| 2,185,124 | Coleman | Dec. 26, 1939 |
| 2,188,895 | Coleman | Dec. 26, 1939 |
| 2,492,955 | Ames et al. | Jan. 3, 1950 |
| 2,545,656 | Dunne | Mar. 20, 1951 |
| 2,552,129 | Windus | May 8, 1951 |